US009384136B2

(12) United States Patent
Dodson et al.

(10) Patent No.: US 9,384,136 B2
(45) Date of Patent: Jul. 5, 2016

(54) MODIFICATION OF PREFETCH DEPTH BASED ON HIGH LATENCY EVENT

(71) Applicant: INTERNATIONAL BUSINESS MACHINES CORPORATION, Armonk, NY (US)

(72) Inventors: John S Dodson, Austin, TX (US); Miles R. Dooley, Austin, TX (US); Benjiman L. Goodman, Cedar Park, TX (US); Jody B. Joyner, Austin, TX (US); Stephen J. Powell, Austin, TX (US); Eric E. Retter, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 13/861,895

(22) Filed: Apr. 12, 2013

(65) Prior Publication Data
US 2014/0310477 A1    Oct. 16, 2014

(51) Int. Cl.
G06F 12/08    (2006.01)
G06F 9/30    (2006.01)
G06F 9/38    (2006.01)

(52) U.S. Cl.
CPC ........ *G06F 12/0862* (2013.01); *G06F 9/30047* (2013.01); *G06F 9/383* (2013.01)

(58) Field of Classification Search
None
See application file for complete search history.

(56) References Cited

U.S. PATENT DOCUMENTS

| 4,621,320 A | * | 11/1986 | Holste et al. | 711/213 |
| 4,965,722 A | * | 10/1990 | Tokuume | G11C 11/406 711/106 |
| 5,566,324 A | | 10/1996 | Kass | |
| 5,778,422 A | | 7/1998 | Genduso et al. | |
| 5,964,867 A | * | 10/1999 | Anderson et al. | 712/219 |
| 6,075,740 A | * | 6/2000 | Leung | 365/222 |
| 6,412,046 B1 | * | 6/2002 | Sharma | G06F 12/0862 711/137 |
| 6,697,882 B1 | | 2/2004 | Matsui | |
| 6,981,099 B2 | * | 12/2005 | Paulraj et al. | 711/137 |
| 7,146,467 B2 | | 12/2006 | Bearden et al. | |
| 7,177,985 B1 | * | 2/2007 | Diefendorff | 711/137 |
| 7,350,029 B2 | | 3/2008 | Fluhr et al. | |
| 7,370,152 B2 | | 5/2008 | Woo et al. | |
| 7,500,061 B2 | * | 3/2009 | Maeda et al. | 711/137 |
| 8,103,832 B2 | | 1/2012 | Gara et al. | |
| 2004/0022094 A1 | * | 2/2004 | Radhakrishnan et al. | 365/200 |

(Continued)

OTHER PUBLICATIONS

Cuppu et al., "A Performance Comparison of Contemporary DRAM Architectures", Published in the Proceedings of the 26th International Symposium on Computer Architecture, May 2-4, 1999.
Kaseridis et al., "Minimalist Open-page A DRAM Page-mode Scheduling Policy for the Many-core Era", MICRO 44, Dec. 3-7, 2011.
Hq Le et al., "IBM POWER6 microarchitecture", IBM J. Res. & Dev. vol. 51 No. 6, Nov. 2007.
Tendler et al., "POWER7 Processors: The Beat Goes On", Date of submitted document: Mar. 22, 2013.

(Continued)

*Primary Examiner* — Yaima Rigol
(74) *Attorney, Agent, or Firm* — Brian F. Russell; Steven L. Bennett

(57) ABSTRACT

A prefetch stream is established in a prefetch unit of a memory controller for a system memory at a lowest level of a volatile memory hierarchy of the data processing system based on a memory access request received from a processor core. The memory controller receives an indication of an upcoming high latency event affecting access to the system memory. In response to the indication, the memory controller temporarily increases a prefetch depth of the prefetch stream with respect to the system memory and issues, to the system memory, a plurality of prefetch requests in accordance with the temporarily increased prefetch depth in advance of the upcoming high latency event.

19 Claims, 8 Drawing Sheets

(56) References Cited

U.S. PATENT DOCUMENTS

| | | | |
|---|---|---|---|
| 2006/0080401 A1* | 4/2006 | Gill | G06F 17/30902 709/217 |
| 2006/0179238 A1* | 8/2006 | Griswell et al. | 711/137 |
| 2006/0253716 A1* | 11/2006 | Dhiman et al. | 713/300 |
| 2008/0098176 A1 | 4/2008 | Krishna et al. | |
| 2011/0066811 A1* | 3/2011 | Sander et al. | 711/137 |
| 2011/0119426 A1* | 5/2011 | Boyle | G06F 12/0862 711/3 |
| 2011/0131380 A1* | 6/2011 | Rallens | G06F 12/0862 711/137 |
| 2011/0161587 A1* | 6/2011 | Guthrie | G06F 12/0862 711/122 |

OTHER PUBLICATIONS

Wang et al., "Modern dram memory systems: performance analysis and scheduling algorithm." Copyright 2005.

Dodson et al. "Modification of Prefetch Depth Based on High Latency Event", U.S. Appl. No. 14/036,284 Non-Final Office Action dated Jul. 14, 2015.

Dodson et al. "Modification of Prefetch Depth Based on High Latency Event", U.S. Appl. No. 14/036,284 Final Office Action dated Dec. 24, 2015.

Dodson et al. "Modification of Prefetch Depth Based on High Latency Event", U.S. Appl No. 14/036,284 Non-Final Office Action dated Mar. 17, 2016.

* cited by examiner

US 9,384,136 B2

MODIFICATION OF PREFETCH DEPTH BASED ON HIGH LATENCY EVENT

BACKGROUND OF THE INVENTION

The present invention relates in general to data processing, and in particular, to decreasing data access latency in a data processing system by prefetching data from system memory.

Prefetching refers to speculatively accessing data in advance of need by a processing element from a higher latency memory (e.g., system memory or lower level cache) and holding the data in a lower latency memory (e.g., a higher level cache). If the data is subsequently accessed by a demand request of the processing element prior to eviction of the data from the lower latency memory, the access latency experienced by the processing element is reduced.

BRIEF SUMMARY

In at least one embodiment, a prefetch stream is established in a prefetch unit of a memory controller for a system memory at a lowest level of a volatile memory hierarchy of the data processing system based on a memory access request received from a processor core. The memory controller receives an indication of an upcoming high latency event affecting access to the system memory. In response to the indication, the memory controller temporarily increases a prefetch depth of the prefetch stream with respect to the system memory and issues, to the system memory, a plurality of prefetch requests in accordance with the temporarily increased prefetch depth in advance of the upcoming high latency event.

DETAILED DESCRIPTION

Figure 1:
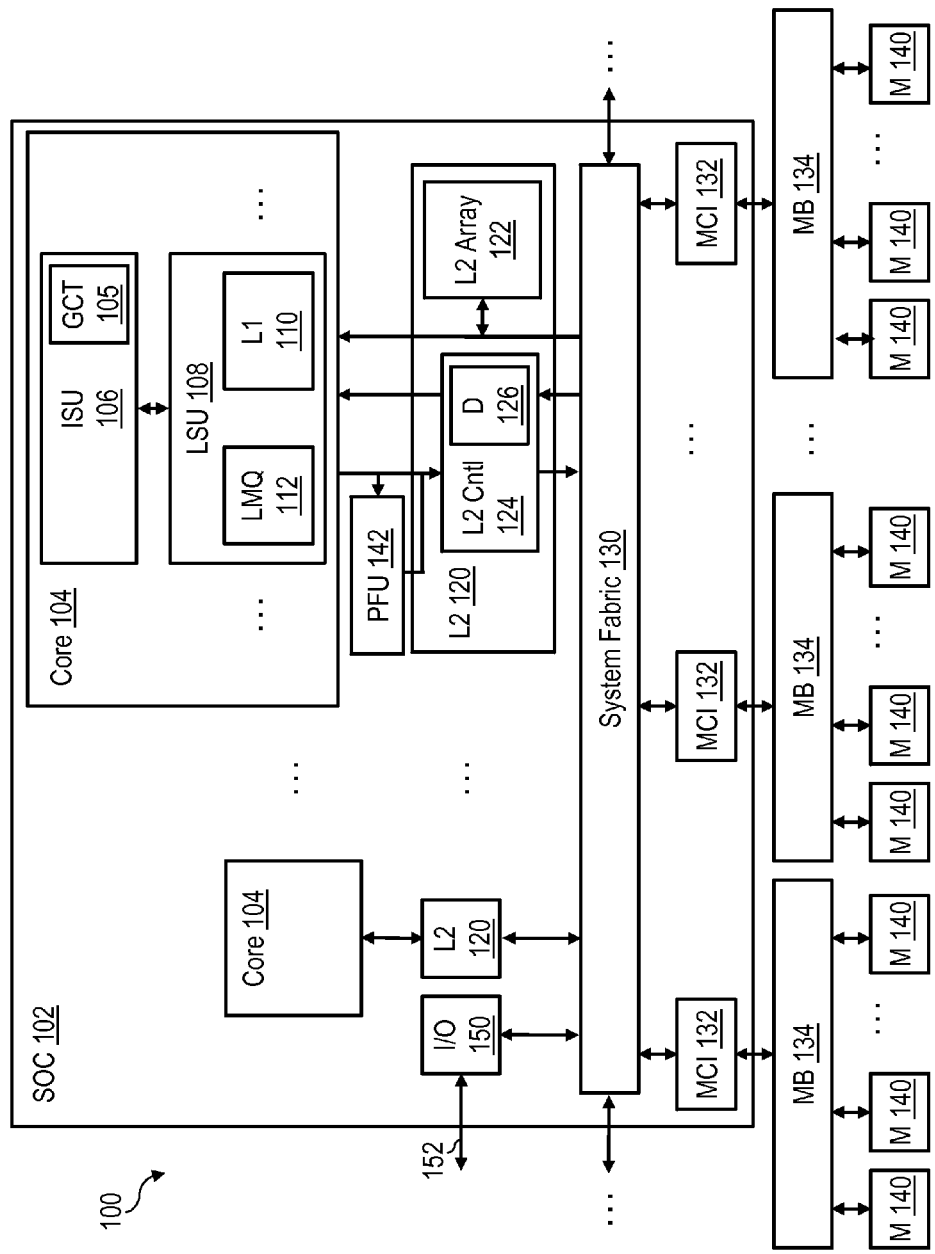
FIG. 1 is a high level block diagram of an exemplary data processing system in accordance with one embodiment.

With reference now to the figures and with particular reference to FIG. 1, there is illustrated a high level block diagram of an exemplary data processing system 100 that is one of the numerous possible embodiments of a data processing system in accordance with the principles and techniques disclosed herein. Data processing system 100 may be implemented, for example, with one of the IBM Power servers, a product line of International Business Machines Corporation of Armonk, N.Y.

In the depicted embodiment, data processing system 100 includes at least one system-on-a-chip (SOC) 102, and as indicated by elliptical notation, possibly numerous SOCs 102 coupled by system fabric 130 integrated within the SOCs 102. Each SOC 102 is preferably realized as a single integrated circuit chip having a substrate in which semiconductor circuitry is fabricated as is known in the art. Each SOC 102 includes multiple processor cores 104 that independently process instructions and data. In some embodiments, processor cores 104 further support simultaneous multithreading in which multiple independent threads are concurrently executed. Each processor core 104 includes an instruction sequencing unit (ISU) 106 for fetching instructions, ordering the instructions for execution, and completing the instructions by committing the results of execution to the architected state of the processor core 104. ISU 106 completes instructions by reference to a global completion table (GCT) 105.

Each processor core 104 further includes one or more execution units for executing instructions such as, for example, fixed and floating point arithmetic instructions, logical instructions, and load-type and store-type instructions that respectively request read and write access to a target memory block in the coherent address space of data processing system 100. In particular, the execution units include a load-store unit (LSU) 108 that executes the load-type and store-type instructions to compute target addresses of read and write memory access operations. LSU 108 includes a store-through level one (L1) cache 110 from which read memory access operations can be satisfied, as well as a load miss queue (LMQ) 112 that tracks read memory access operations that miss in L1 cache 110.

The operation of each processor core 104 is supported by a multi-level hierarchical memory subsystem having at its lowest level one or more shared system memories 140 (e.g., bulk DRAM) generally accessible by any of processor cores 104 in any of the SOCs 102 in data processing system 100, and at its upper levels, one or more levels of cache memory. As depicted, SOC 102 includes one or more (and preferably multiple) memory channel interfaces (MCIs) 132, each of which supports read and write accesses to an associated collection of system memories 140 in response to memory access operations received via system fabric 130 from processor cores 104 in the same SOC 102 or other SOCs 102. In the depicted embodiment, each MCI 132 is coupled to its associated collection of system memories 140 via an external memory buffer (MB) 134. Each pair of an MCI 134 and MB 134 thus forms a distributed memory controller.

In the illustrative embodiment, the cache memory hierarchy supporting each processor core 104 of SOC 102 includes the store-through level one (L1) cache 110 noted above and a private store-in level two (L2) cache 120. As shown, L2 cache 120 includes an L2 array 122 and an L2 controller 124, which includes control logic and a directory 126 of contents of L2 array 122. L2 controller 124 initiates operations on system fabric 130 and/or accesses L2 array 122 in response to memory access (and other) requests received from the associated processor core 104. In an embodiment in which a snoop-based coherency protocol is implemented (as will be hereafter assumed unless otherwise noted), L2 controller 124 additionally detects operations on system fabric 130, provides appropriate coherence responses, and performs any accesses to L2 array 122 required by the snooped operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As will be appreciated, with current technologies the memory access latency experienced by a processor core 104 for requests serviced by a system memory 140 can be significantly greater than that for memory access requests serviced by an L2 cache 120. For example, in one embodiment, L1 cache 110 can be accessed in a single processor core clock cycle, a local L2 cache 120 can be accessed in approximately 3-5 processor core clock cycles, and off-chip system memories 140 can be accessed in 300-400 processor core clock cycles. Each core 104 therefore preferably has an associated core prefetch unit (PFU) 142 that prefetches memory blocks of data in advance of need from lower levels of the memory hierarchy (e.g., lower level cache or system memory 140) into higher levels of the memory hierarchy (e.g., L1 cache 110 and/or L2 cache 120) based on observed spatial locality in demand access patterns of the associated core 104. In at least one embodiment, core PFU 142 can be implemented as a stream-based prefetcher that prefetches memory blocks of data in multiple concurrent address streams as described in U.S. Pat. No. 7,350,029 B2, which is incorporated herein by reference.

In an embodiment in which core PFU 142 is implemented as a stream-based prefetcher, core PFU 142 detects monotonically increasing or decreasing sequences of demand accesses to cache lines having a common stride (i.e., address spacing). In response to detecting such a sequence, core PFU 142 establishes a prefetch stream and issues prefetch requests to the memory hierarchy to retrieve one or more cache lines in the prefetch stream into L2 cache 120 or L1 cache 110 before the program requires them. Core PFU 142 also preferably selects a respective depth of prefetching (i.e., a number of cache lines to retrieve at a time) for each prefetch stream individually so that a sufficient number of cache lines is prefetched in each stream to avoid a cache miss latency penalty while at the same time not polluting the cache hierarchy with unneeded prefetch data that increases misses for demand accesses. Core PFU 142 thus preferably supports dynamic and stream-specific control over prefetch parameters including the prefetch depth. Core PFU 142 continues prefetching in a prefetch stream as long as the prefetch stream continues to be confirmed by demand accesses or until the prefetch stream is replaced by a subsequently established stream.

SOC 102 further includes one or more integrated I/O (input/output) interfaces 150 supporting I/O communication via one or more external communication links 152 with one or more I/O controllers, such as PCI host bridges (PHBs), InfiniBand controllers, FibreChannel controllers, etc. Those skilled in the art will appreciate that data processing system 100 can include many additional or alternative components, which are not necessary for an understanding of the invention set forth herein are accordingly not illustrated in FIG. 1 or discussed further herein.

Figure 2:
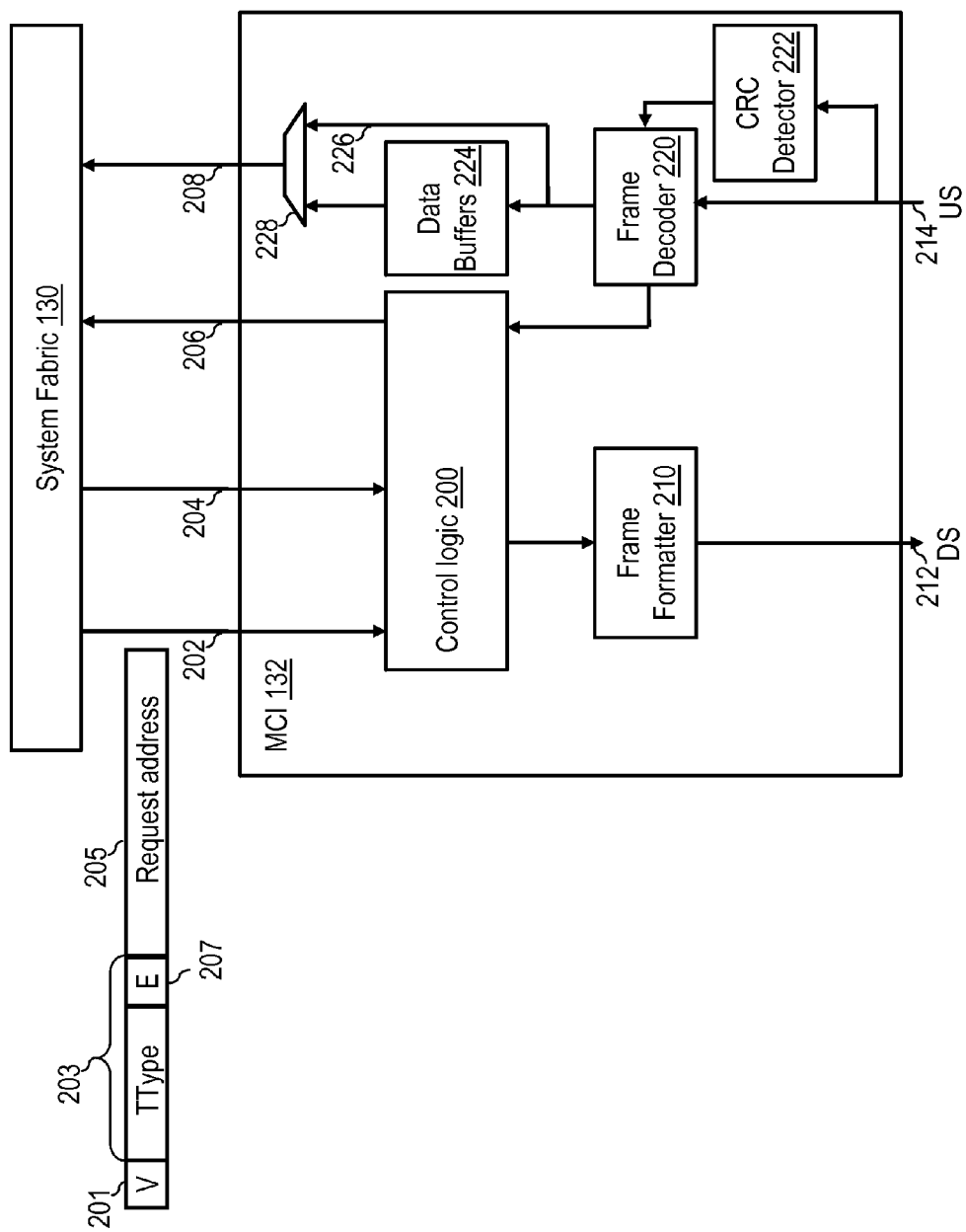
FIG. 2 is a more detailed view of a memory channel interface (MCI) of FIG. 1 in accordance with one embodiment.

Referring now to FIG. 2, there is depicted a more detailed view of one of the memory channel interfaces (MCIs) 132 of FIG. 1 in accordance with one embodiment. In the depicted embodiment, MCI 132 is coupled to system fabric 130 via downstream (i.e., toward memories 140) request and data interfaces 202 and 204 and upstream (i.e., toward system fabric 130) control and data interfaces 206 and 208. Request interface 202 receives from system fabric 130 read and write memory access requests of various operations. Data interface 204 receives from system fabric 130 data to be written to the associated collection of system memories 140 by write memory access requests. Control and data interfaces 206 and 208 are utilized to return requested data to various request sources (e.g., processor cores 104 and I/O controllers 150) via system fabric 130.

As indicated in FIG. 2, each memory access request received on request interface 202 includes, for example, a valid field 201 indicating whether the memory access request of the operation is valid, a transaction type (TType) field 203 indicating the transaction type of the memory access request (e.g., a read or a write), and a request address field 205 specifying the address of the target memory block of the memory access request. In one embodiment, TType field 203 supports distinct transaction types for prefetch read requests originated by core PFUs 142 that distinguish these prefetch read requests from demand read requests (e.g., those initiated in response to execution by a processor core 104 of a load instruction whose target address missed in the core's cache hierarchy). The transaction type of a prefetch read request optionally but preferably includes an extended (E) bit 207 that is set (e.g., to '1') by the core PFU 142 initiating the prefetch read request to indicate that the prefetch stream including the current prefetch read request is expected to be an extended (i.e., particularly long) prefetch stream and that is reset (e.g., to '0') by the core PFU 142 to indicate a prefetch stream expected to be of normal length. Core PFU 142 may determine whether to set the E bit 207 for prefetch read requests in a given prefetch stream based, for example, on compiler-supplied configuration information, the distance between the initial address of the prefetch stream and a next address to be prefetched in the prefetch stream, and/or a quantity of prefetch data from the prefetch stream that has been accessed by demand accesses.

MCI 132 includes control logic 200 that controls access to the associated collection of system memories 140 in response to memory access operations received from system fabric 130. In response to receipt of the request of a memory access operation on system fabric 130, control logic 200 determines by reference to valid field 201 and request address field 205 of the memory access request whether or not the memory access request is valid and specifies a target address within the collection of system memories 140 controlled by that MCI 132. If not, the memory access request is dropped. If, however, control logic 200 validates and qualifies the memory access request as directed to one of its associated system memories 140, control logic 200 transmits the memory access request (including for prefetch read requests, E bit 207) and associated write data, if any, to frame formatter 210.

Frame formatter 210, in response to receipt of the memory access request and write data, if any, formats the memory access request and write data, if any, into one or more frames and transmits those frame(s) to a memory buffer 134 coupled to SOC 102 via a downstream memory buffer interface 212. As will be appreciated, the frame format may vary widely between implementations based on a variety of factors including the pin counts available to implement downstream memory buffer interface 212 and the corresponding upstream memory buffer interface 214.

As further shown in FIG. 2, MCI 132 additionally includes a frame decoder 220 that receives frames from a memory buffer 134 coupled to SOC 102 via upstream memory buffer interface 214. Frame decoder 220 decodes such frames to extract data being transmitted upstream and associated control information. Cyclic Redundancy Check (CRC) detector 222 additionally performs a CRC (e.g., parity check or other CRC processing) on the frame in parallel with the processing performed by frame decoder 220 to verify that the frame has not been corrupted in transmission from memory buffer 134. In response to CRC detector 222 signaling that the frame has not been corrupted, frame decoder 220 forwards control information extracted from the frame, such as a data tag identifying the operation to which the data belongs and a data error indicator indicating whether or not the data contains an error. Control logic 200 receives the control information extracted by frame decoder 220 and forwards that control information to system fabric 130 via upstream control interface 206. MCI 132 additionally includes two data paths for upstream data extracted by frame decoder 220: (1) a fast path 226 selected for critical words of target memory blocks and other high priority data transfers, and (2) a buffered data path including data buffers 224 for buffering low priority data. A multiplexer 228 applies a selected arbitration policy to select data from one of the two data paths for transmission on system fabric 130, but to minimize access latency, preferentially selects data from fast path 226 without starving out the buffered data path.

Figure 3:
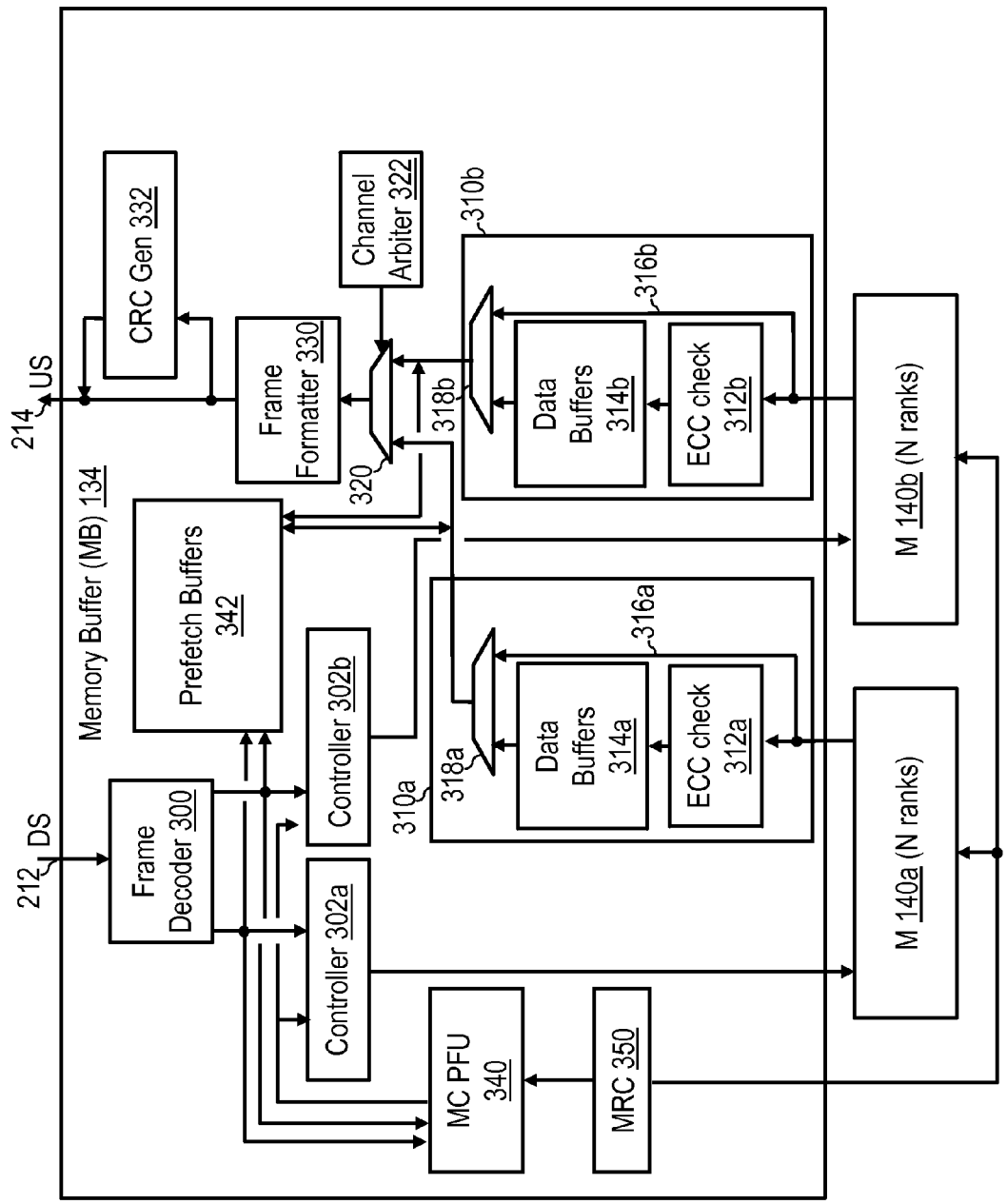
FIG. 3 is a more detailed view of a memory buffer (MB) of FIG. 1 in accordance with one embodiment.

With reference now to FIG. 3, there is illustrated a more detailed view of a memory buffer 134 of FIG. 1 in accordance with one embodiment. In the illustrated embodiment, memory buffer 134 includes a frame decoder 300 that receives frames from MCI 132 via downstream memory buffer interface 212. Frame decoder 300 decodes the frames and determines to which of multiple attached system memories 140 each memory access request is directed. Thus, in the depicted example in which the attached system memories 140 include at least system memories 140a and 140b, frame decoder 300 determines whether memory access requests specify a target address assigned to system memory 140a or to system memory 140b, and accordingly forwards the memory access requests to controller 302a or controller 302b for servicing. Controllers 302a and 302b service memory access request received from controllers 302a, 302b by directing appropriate read or write accesses to the associated one of system memories 140a and 140b.

Memory buffer 134 additionally includes a respective read channel 310a, 310b for each attached system memory 140a, 140b. Each of read channels 310a, 310b includes an ECC check circuit 312a, 312b that performs error detection and error correction processing, preferably on all data read from the associated one of system memories 140a, 140b. Each of read channels 310a, 310b further includes a fast path 316a, 316b by which selected data granules read from the associated one of system memories 140a, 140b are also permitted to bypass ECC check circuit 312a, 312b in order to decrease memory access latency. For example, in one embodiment in which a memory block is communicated from system memories 140 to processor cores 104 in four granules, only the first three of the four data granules are permitted to speculatively bypass the ECC check circuit 312, while all four granules are also always routed through ECC check circuit 312 so that a data error indicator indicating whether or not the memory block contains an error can conveniently be forwarded upstream with the last granule. The first three of the four data granules that are also routed through the ECC check circuit 312 are then discarded since they were already forwarded via the fast path 316a, 316b. To permit data transmitted via fast path 316a, 316b to be forwarded with minimal latency, each of read channels 310a, 310b additionally includes data buffers 314a, 314b for buffering lower priority data output by ECC check circuit 312a, 312b as needed. A multiplexer 318a, 318b within each read channel 310a, 310b applies a selected arbitration policy to select data from data buffers 314a, 314b and fast path 316a, 316b for forwarding. The arbitration policy preferentially selects data from fast path 316a, 316b without starving out the buffered data path.

The read channels 310a, 310b of memory buffer 134 are all coupled to inputs of a multiplexer 320 controlled by a channel arbiter 322. Channel arbiter 322 applies a desired arbitration policy (e.g., modified round robin) to generally promote fairness between read channels 310a, 310b, while giving preference to data transfers of fast path data. Each data transfer selected by channel arbiter 322 is received by frame formatter 330, which formats the data transfer into one or more frames and transmits those frame(s) to the MCI 132 coupled to memory buffer 134 via an upstream memory buffer interface 214 after a check value is appended by CRC generator 332.

MB 134 further includes a memory controller prefetch unit (MC PFU) 340 that selectively prefetches memory blocks of data from the associated system memories 140 into prefetch buffers 342 in MB 134. In some embodiments, prefetch buffers 342 are implemented as a set-associative lower level cache (e.g., L3 or L4 cache) including a data array, cache directory and cache controller. In other embodiments, prefetch buffers 342 are not implemented as a cache and are instead implemented a set of multiple buffers each providing storage for, for example, a valid bit, a real address and a memory block of data. As shown, MC PFU 340 is coupled to a memory refresh controller (MRC) 350 that schedules and controls the refresh cycles of dynamic system memory 140. As described in detail below, MC PFU 340 selectively modifies the depth of prefetching in one or more prefetch streams based on an indication that a high latency event, such as a DRAM refresh cycle, is about to occur.

Figure 4:
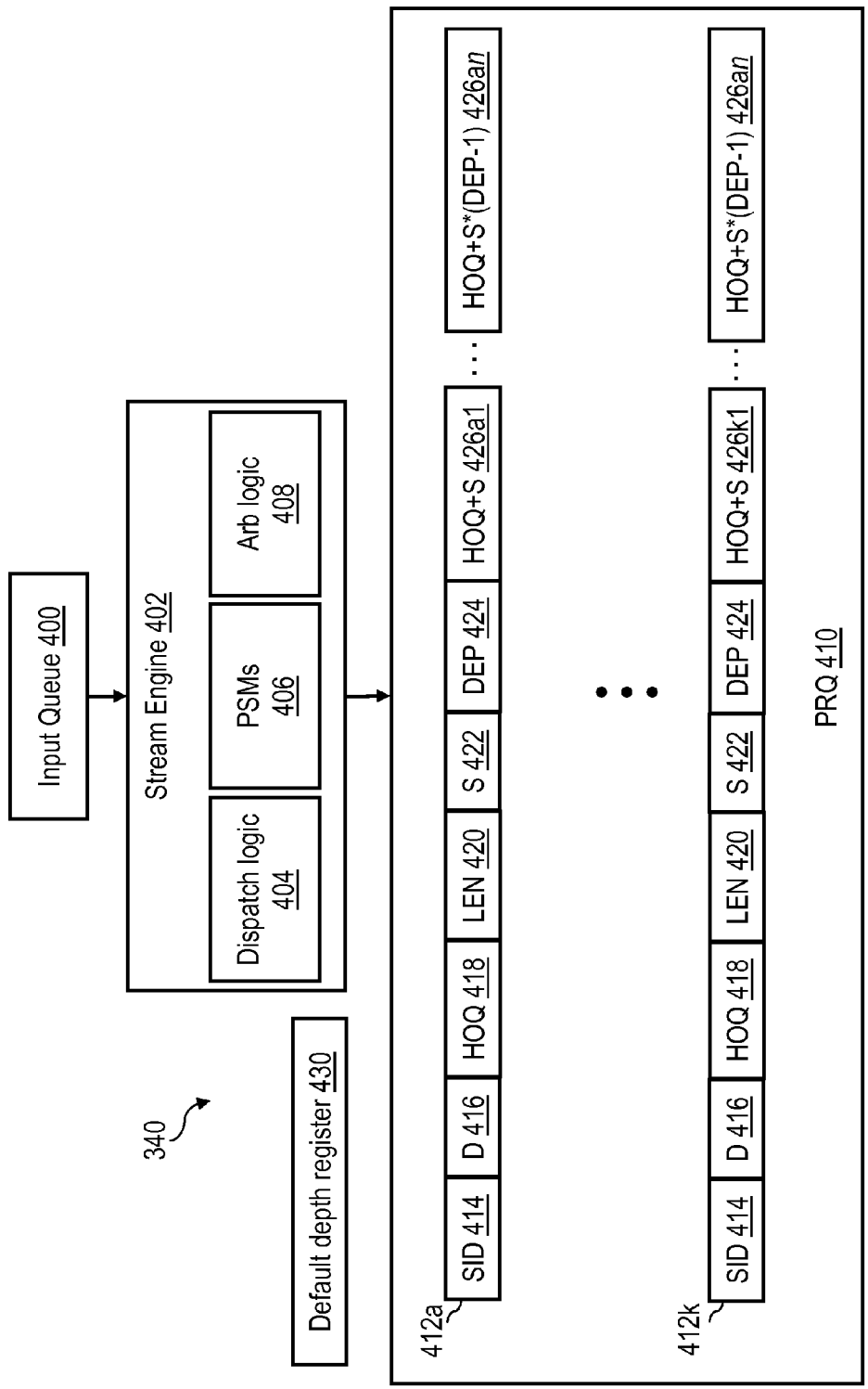
FIG. 4 is a more detailed view of a memory controller prefetch unit (MC PFU) of FIG. 3 in accordance with one embodiment.

Referring now to FIG. 4, there is depicted a more detailed view of a memory controller prefetch unit (MC PFU) 340 in accordance with one embodiment. In the depicted embodiment, MC PFU 340 includes an input queue 400 that buffers memory access requests received from frame decoder 300 and provides the memory access requests to prefetch engine 402. Based on selected memory access requests received from input queue 400, prefetch engine 402 installs entries in an associated prefetch request queue (PRQ) 410 by reference to which stream engine 402 creates and manages a plurality of concurrent prefetch streams. Stream engine 402 includes dispatch logic 404 that, based on the contents of PRQ 410, selects prefetch requests to be issued to controllers 302a, 302b and that allocates a prefetch state machine 406 to manage each such prefetch request until the target memory block of the prefetch request is received in prefetch buffers 342.

PRQ 410 includes a plurality of stream registers 412a-412k each recording information describing a respective prefetch stream. In the depicted embodiment, each stream register 412 of PRQ 410 includes a stream identification field (SID) 414 that uniquely identifies the prefetch stream and a direction field 416 (D) that indicates whether the addresses in the stream are monotonically ascending or descending. Each stream register 412 further includes a head of queue (HOQ) field 418 that serves as a working pointer that specifies a current address in the prefetch stream, a length (LEN) field 420 that indicates the length of the prefetch stream (for example, as a terminal real address or a number of memory blocks remaining until the end of the prefetch stream is reached), a stride field (S) 422 that indicates a stride of the prefetch stream, and a depth (DEP) field 424 that indicates the number of cache lines in the stream to be prefetched ahead of the current location indicated by HOQ field 420. Upon instantiation of a prefetch stream, depth field 424 may be initialized to a default depth, for example, specified by a default depth register 430 accessible to software and/or hardware of data processing system 100. As noted below, the depth of prefetching in an individual prefetch stream may thereafter be adjusted by stream engine 402 based on, for example, a software instruction, confirmation by stream engine 402 of one or more memory access requests hitting in the stream, and/or other events, such as an upcoming DRAM refresh cycle. Each stream register 412 may optionally further include a number of prefetch request entries 426a1-426an that buffer prefetch requests that have been generated for subsequent scheduling by dispatch logic 404.

Figure 5:
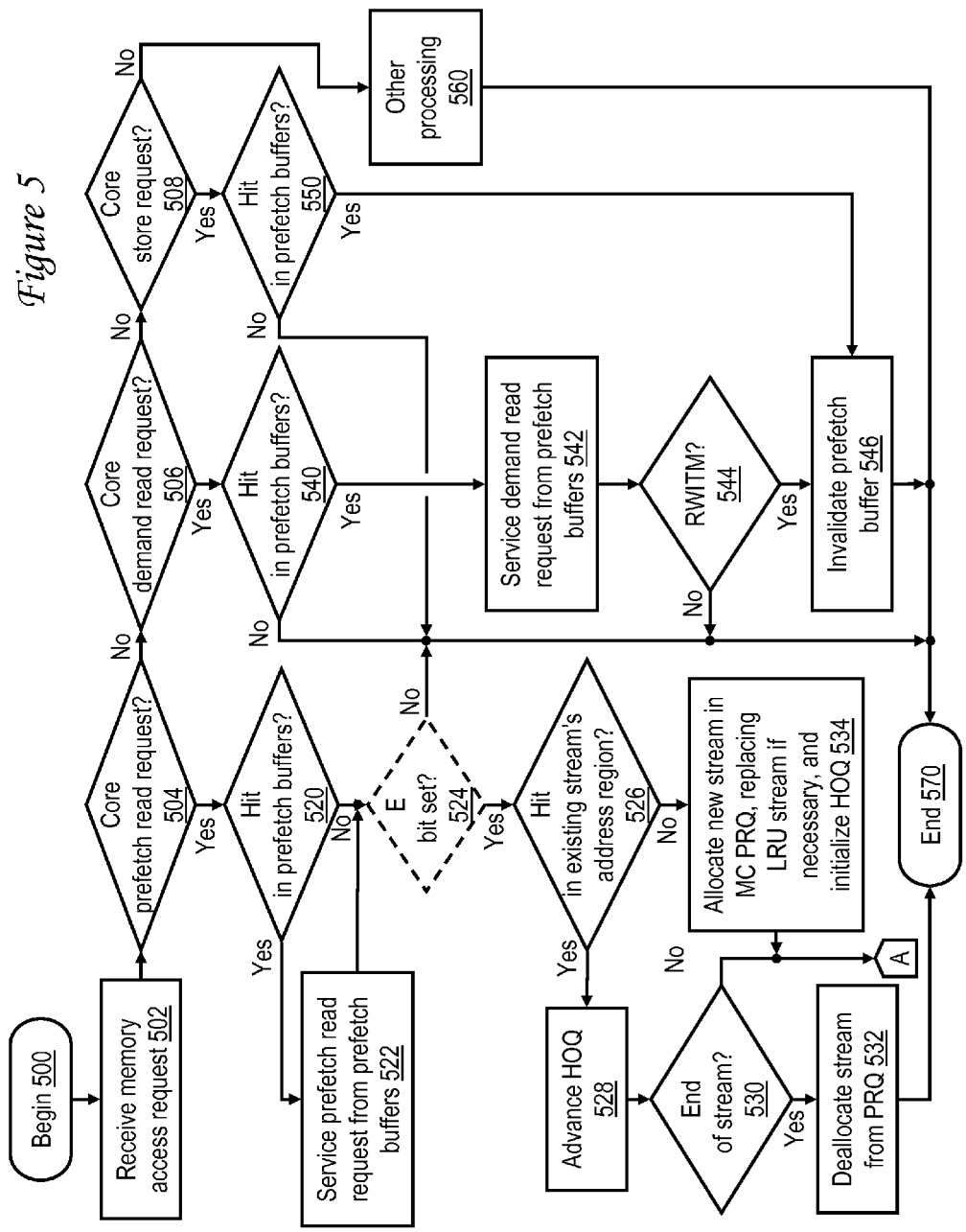
FIG. 5 is a high level logical flowchart of an exemplary method by which an MC PFU responds to a memory access request in accordance with one embodiment.

With reference now to FIG. 5, there is illustrated a high level logical flowchart of an exemplary method by which an MC PFU 340 responds to a memory access request in accordance with one embodiment. The illustrated process begins at block 500 and then proceeds to bock 502, which depicts MC PFU 340 receiving a memory access request from frame decoder 300 (which in turn received the memory access request from system fabric 130 and the associated MCI 132). In parallel with receipt of the memory access request by MC PFU 340, the target address of the memory access request is also compared to the addresses of prefetched memory blocks residing in prefetch buffers 342. As indicated at blocks 504, 506 and 508, following buffering of the memory access request in input queue 400, stream engine 402 determines whether or not the memory access request is a core prefetch read request (block 504), a core demand read request (block 506), or a core store request (block 508). If the memory access request is not any of these request types, the memory access request is handled via other processing as shown at block 560. Thereafter, the process of FIG. 5 ends at block 570.

In response to a determination at block 504 that the memory access request is a core prefetch read request issued by a core PFU 142, the process proceeds to block 520, which depicts stream engine 402 determining whether or not the lookup of the target address of the prefetch read request resulted in a hit in prefetch buffers 342. If so, stream engine 342 directs the servicing of the prefetch read request from prefetch buffers 342 by causing the corresponding memory block to be read out of prefetch buffers 342 and transmitted upstream for delivery to the requesting processor core 104 (block 522). Following block 522 or a negative determination at block 520, the process proceeds to block 524.

Block 524 depicts an optional determination regarding whether or not E bit 207 of the current prefetch read request is set. As noted above, a core PFU 142 that originates a prefetch read request optionally sets E bit 207 to identify the prefetch stream including the prefetch read request as one that is expected to be an extended (i.e., particularly long) prefetch stream and would consequently benefit from additional prefetching initiated by MC PFU 340. In response to a determination at block 524 that E bit 207 is not set for the current prefetch read request, the process of FIG. 5 ends at block 570 without the establishment or advancement of a prefetch stream in MC PFU 340. If, however, optional block 524 is omitted or stream engine 402 determines at block 524 that the E bit 207 of the current prefetch read request is set, stream engine 402 establishes a new prefetch stream or advances an existing prefetch stream. In particular, stream engine 402 further determines at block 526 whether or not the target address of the prefetch read request hit in the address region of any of the existing prefetch streams described in stream registers 412a-412k of PRQ 410. For example, the determination shown at block 526 can be made by comparing a predetermined number of high order address bits of the target address with the corresponding bits of the working pointers recorded in HOQ fields 418 of stream registers 412.

In response to determining that the target address of the prefetch read request hit in the address region of one of the existing prefetch streams, stream engine 402 advances the working pointer recorded in the HOQ field 418 of the relevant stream register 412 by the depth indicated in depth field 424 and in the direction indicated by direction field 416 (block 528). At block 530, stream engine 402 determines whether the working pointer in HOQ field 418 has reached the end of the prefetch stream indicated by length field 420. If not, the process proceeds through page connector A to FIG. 6, which is described below. If, however, stream engine 402 determines at block 530 that the end of the stream has been reached, stream engine 402 deallocates the stream register 412 allocated to the prefetch stream, freeing the stream register 412 for allocation to another prefetch stream. Thereafter, the process of FIG. 5 ends at block 570.

Returning to block 526, in response a determination that the target address of the prefetch read request does not hit in the address region of any of the existing prefetch streams recorded in stream registers 412, stream engine 402 allocates a stream register 412 of PRQ 410 to establish a new prefetch stream and populates fields 414-424 with attributes of the prefetch stream (block 534). If necessary due to resource constraints, stream engine 402 deallocates a stream register 412 (e.g., the least recently used stream register 412) allocated to a previously established prefetch stream in order to reallocate the stream register 412 to the new prefetch stream. Following block 534, the process passes through page connector A to FIG. 6, which is described below.

Returning to block 506, in response to a determination by stream engine 402 that a received memory access request is a demand read request of a processor core 104, stream engine 402 determines at block 540 whether or not the target address of the demand read request hit in prefetch buffers 342. If not (i.e., the target address missed in prefetch buffers 342), the process ends at block 570. If, however, the target address of the demand read request hit in prefetch buffers 342, stream engine 402 directs the servicing of the demand read request from prefetch buffers 342 by causing the corresponding memory block to be read out of prefetch buffers 342 and transmitted upstream toward the requesting processor core 104 (block 542). Depending on implementation, stream engine 402 may also signal the relevant one of controllers 302 to ignore the demand read request in order to avoid unnecessary access to system memory 140 and data duplication. At block 544, stream engine 402 further determines whether the demand read request is a read-with-intent-to-modify (RWITM) request by which a requesting processor core 104 obtains exclusive access to a memory block for the purpose of modifying the memory block. If not, the process of FIG. 5 passes directly to block 570 and ends. However, in response to determining that the demand read request is a RWITM request, stream engine 402 also invalidates the relevant one of prefetch buffers 342 to maintain coherence of the target memory block in view of the anticipated update to the target memory block by the requesting processor core 104 (block 546). The process of FIG. 5 thereafter ends at block 570.

Referring again to block 508, in response to a determination by stream engine 402 that a received memory access request is a store request of a processor core 104, stream engine 402 determines at block 550 whether or not the target address of the store request hit in prefetch buffers 342. If not (i.e., the target address missed in prefetch buffers 342), the process ends at block 570. If, however, the target address of the store request hit in prefetch buffers 342, stream engine 342 invalidates the relevant one of prefetch buffers 342 in order to maintain coherence of the target memory block in the presence of the indicated update to the image of the target memory block held in system memory 140 (block 546). The process of FIG. 5 thereafter ends at block 570.

Figure 6:
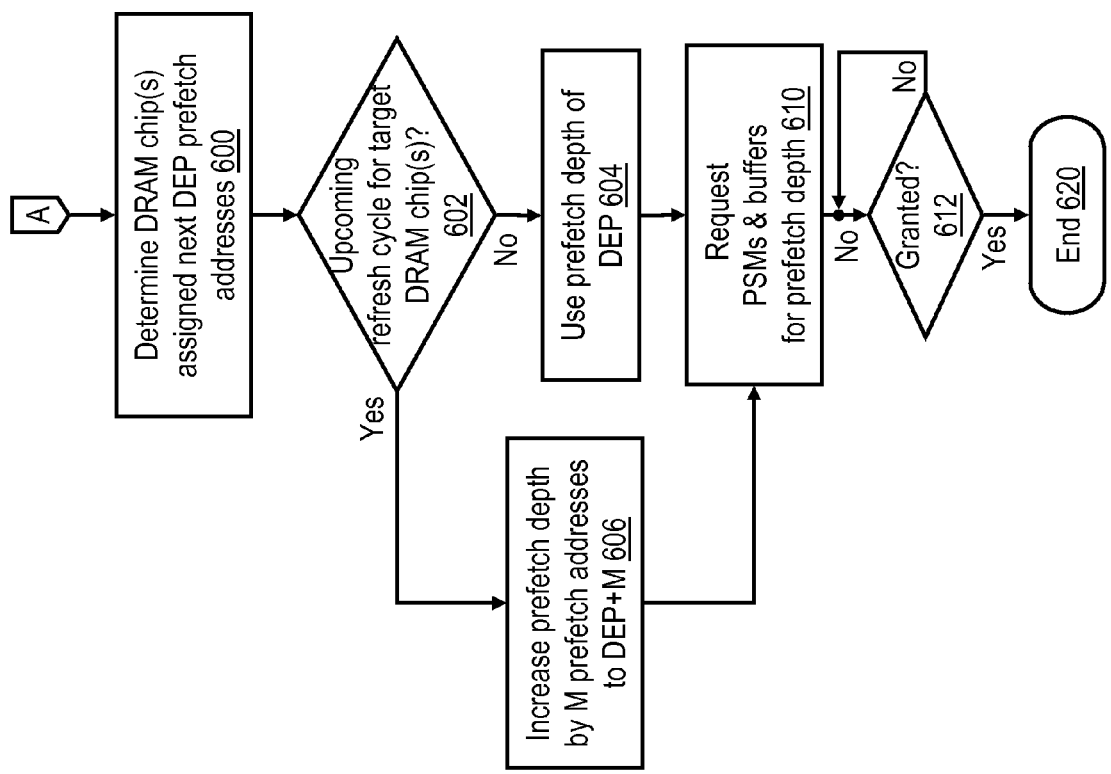
FIG. 6 is a high level logical flowchart of an exemplary method by which MC PFU temporarily increases prefetch depth in advance of a high latency event such as a DRAM refresh cycle in accordance with one embodiment.

Referring now to FIG. 6, there is depicted a high level logical flowchart of an exemplary method by which MC PFU 340 temporarily increases the prefetch depth of a prefetch stream in advance of a high latency event such as a DRAM refresh cycle in accordance with one embodiment. The process continues from the process of FIG. 5 at page connector A and then proceeds to block 600, which depicts stream engine 402 determining by reference to a known mapping between real addresses and system memories 140 which DRAM chip(s) are assigned the real addresses for the next group of prefetch addresses in the current prefetch stream (i.e., HOQ, HOQ+S, . . . , HOQ+S*(DEP−1)). At block 602, stream engine 402 further determines whether or not MRC 350 has indicated that it has scheduled an upcoming refresh cycle for one or more of the DRAM chip(s) to which one or more of the next group of prefetch addresses map. If not, the process proceeds to block 604, which illustrates stream engine 402 selecting the prefetch depth indicated by DEP field 416 to generate the next group of DEP prefetch requests. The process then proceeds from block to block 610, which is described below.

Returning to block 602, in response to a determination by stream engine 402 that MRC 350 has indicated that it has scheduled an upcoming refresh cycle for one or more of the DRAM chip(s) to which one or more of the next group of prefetch addresses map, stream engine 402 temporarily increases the prefetch depth of the prefetch stream from the depth indicated by DEP field 424 of the relevant stream register 412 by M memory blocks and uses this expanded prefetch depth to generate DEP+M prefetch requests (block 606). The process then proceeds to block 610.

Block 610 illustrates stream engine 402 presenting to dispatch logic 404 a request for a respective PSM 406 and prefetch buffer 342 for each of the prefetch requests generated at block 604 or block 606. In considering the allocation of PSMs 406 and prefetch buffers 342, dispatch logic 404 preferably gives higher relative priority to the requests of prefetch streams subject to an upcoming DRAM refresh cycle. In allocating resources, dispatch logic 404 also preferentially allocates PSMs 406 and prefetch buffers 342 to requests that fall within the same memory page so that all such prefetch requests can be made using a page mode access (i.e., while the DRAM page is "open"). The process then iterates at block 612 until the request is granted and the requested PSMs 406 and associated prefetch buffers 342 are allocated by dispatch logic 404 to manage completion of the prefetch requests. Following block 612, the process of FIG. 6 ends at block 620.

Although FIG. 6 illustrates a particular embodiment in which prefetch depth is temporarily increased in view of a particular upcoming long latency event, namely, a DRAM refresh cycle, it should be understood that other embodiments are not limited to this event. Instead, the dynamic increase in prefetch depth can be made in response to other long latency events visible to the memory controller prefetch unit (MC PFU). Further, it should be understood that such events are generally, but are not required to be, asynchronous with core memory access requests and memory controller prefetch requests.

Figure 7:
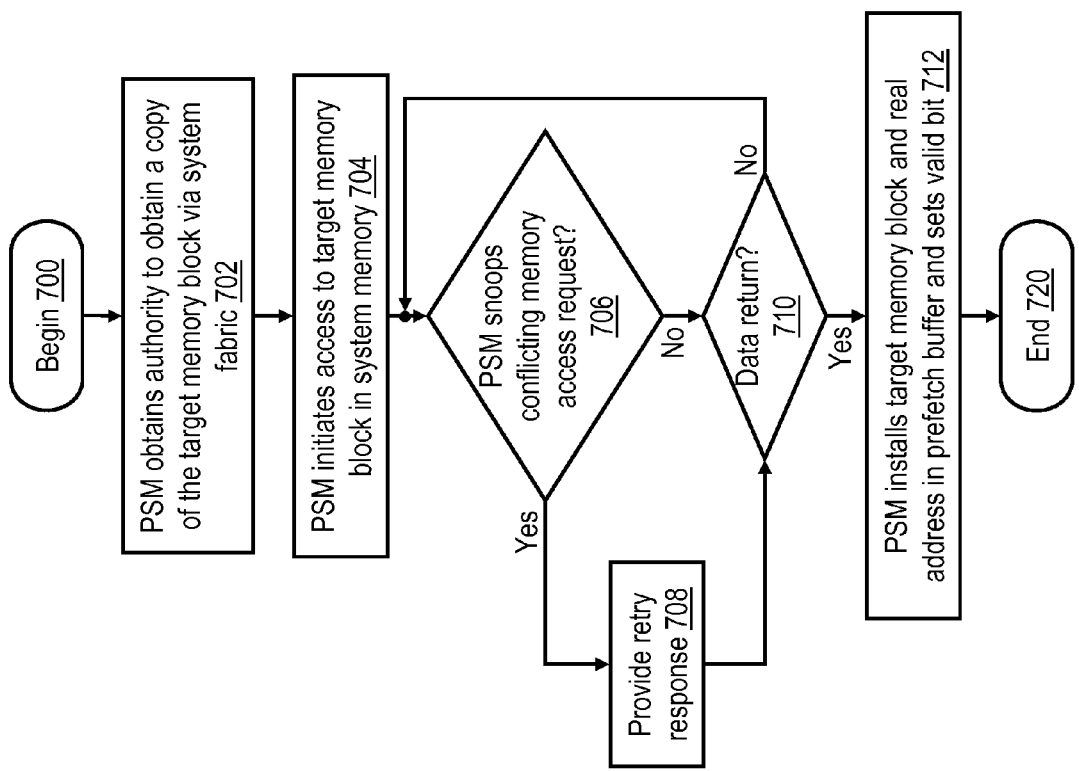
FIG. 7 is a high level logical flowchart of an exemplary method by which a prefetch state machine manages prefetching of a target memory block from system memory in accordance with one embodiment.

With reference now to FIG. 7, there is illustrated a high level logical flowchart of an exemplary method by which a prefetch state machine (PSM) 406 manages prefetching of a target memory block from system memory 140 in accordance with one embodiment. The illustrated process is performed in parallel by each of the PSMs 406 dispatched at blocks 610-612 of FIG. 7.

The process of FIG. 7 begins at block 700 in response to dispatch of the PSM 406 by dispatch logic 404 to manage prefetching of a particular target memory block from system memory 140. The process proceeds from block 700 to block 702, which illustrates the PSM 406 obtaining authority, via communication over system fabric 130, to obtain a copy of the target memory block. The communication required at block 702 can vary between embodiments depending upon whether cache coherence is maintained by a directory-based or snoop-based coherence protocol. In either class of embodiments, if a cached version of the target memory block is modified with respect to the corresponding memory block in system memory 140 (as indicated, for example, by the Modified coherence state of the conventional MESI (Modified, Exclusive, Shared, Invalid) coherence protocol, the target memory block may have to be flushed to system memory 140 in order for the PSM 406 to obtain authority to prefetch the target memory block. In at least some embodiments, a PSM 406 may discard a prefetch request that targets a memory block for which a modified version is held (or is likely to be held) in the cache hierarchy of a processor core 104 without servicing the prefetch request. Discarding selected prefetch requests targeting modified memory blocks in this manner is particularly advantageous in embodiments supporting cache-to-cache intervention because the access latency of the cached modified copy of the target memory block is likely to be less than the access latency to prefetch buffers 342. It should be noted that if a prefetch request is discarded erroneously, access latency to the target memory block may increase, but no computational or coherence error results.

Assuming that the PSM 406 obtains authority to access the target memory block at block 702 and does not discard the prefetch request without servicing it, PSM 406 initiates access to the target memory block in system memory 140 through the appropriate one of controllers 302a, 302b in advance of the upcoming DRAM refresh cycle (block 704). The relative ordering of competing access requests of the various PSMs 406 is determined by arbitration logic 408 of stream engine 402. Again, arbitration logic 408 preferably grants higher priority to prefetch requests directed to DRAM chips indicated by MRC 350 as having upcoming refresh cycles and page mode prefetch requests.

In embodiments employing a snoop-based coherence protocol, until the target memory block is returned from system memory 140 to the designated one of prefetch buffers 342 as determined at block 710, PSM 406 protects its authority to obtain a copy of the target memory block by snooping memory access requests from system fabric 130. As shown at blocks 706 and 708, if a snooped memory access request also targets the same target memory block, PSM 406 provides a Retry partial response (i.e., its individual response) for the snooped memory access request in order to force it to be retried. In response to return of the target memory block from system memory 140, PSM 406 installs the target memory block and its real address in the allocated prefetch buffer 342 and sets the associated valid bit (block 712). Thereafter, the process of FIG. 7 ends at block 720, and the PSM 406 is deallocated.

Figure 8:
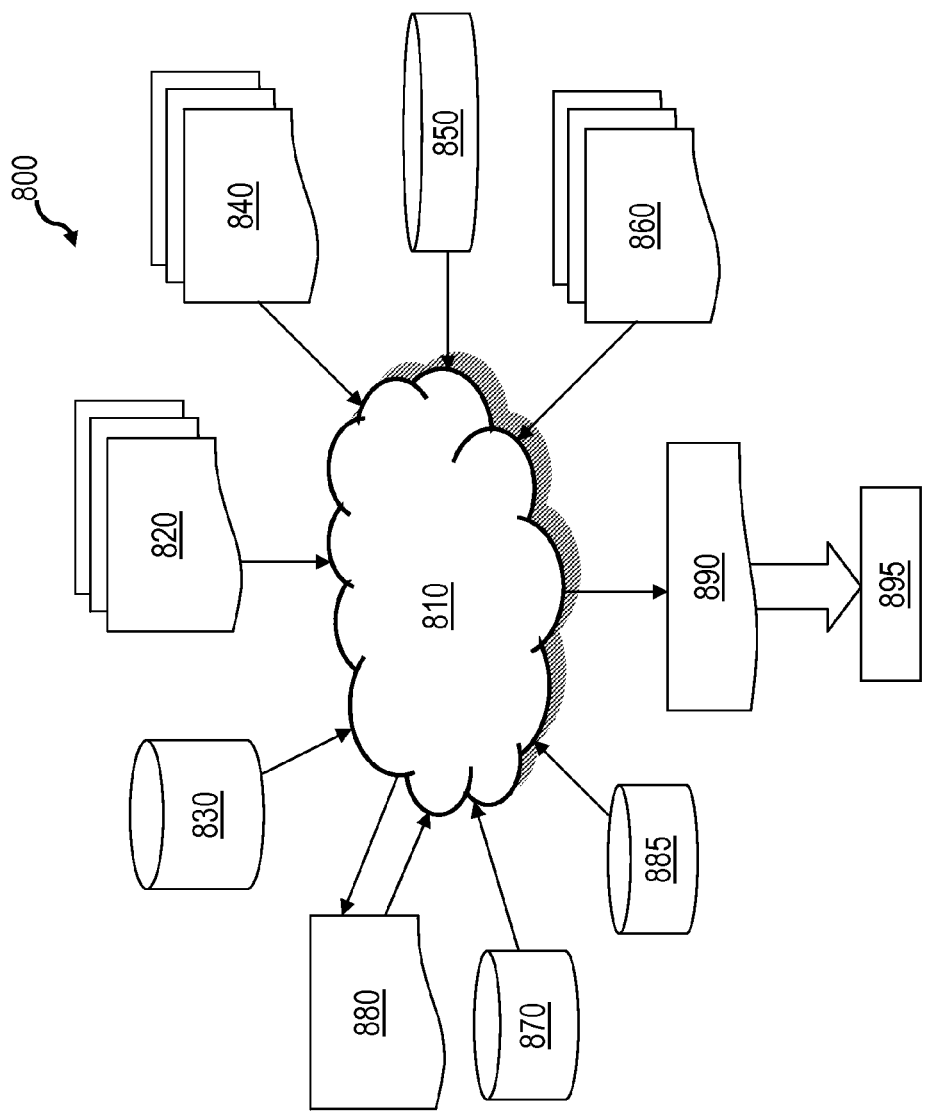
FIG. 8 is a data flow diagram of an exemplary design process.

Referring now to FIG. 8, there is depicted a block diagram of an exemplary design flow 800 used for example, in semiconductor IC logic design, simulation, test, layout, and manufacture. Design flow 800 includes processes, machines and/or mechanisms for processing design structures or devices to generate logically or otherwise functionally equivalent representations of the design structures and/or devices described above. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown above. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures disclosed above to generate a netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 810 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention disclosed herein. In one embodiment, design structure 890 may comprise a compiled, executable HDL simulation model that functionally simulates the devices disclosed above.

Design structure 890 may also employ a data format used for the exchange of layout data of integrated circuits and/or symbolic data format (e.g., information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above. Design structure 890 may then proceed to a stage 895 where, for example, design structure 890: proceeds to tape-out, is released to manufacturing, is released to a mask house, is sent to another design house, is sent back to the customer, etc.

As has been described, in at least one embodiment, a prefetch stream is established in a prefetch unit of a memory controller for a system memory at a lowest level of a volatile memory hierarchy of the data processing system based on a memory access request received from a processor core. The memory controller receives an indication of an upcoming high latency event affecting access to the system memory. In response to the indication, the memory controller temporarily increases a prefetch depth of the prefetch stream with respect to the system memory and issues, to the system memory, a plurality of prefetch requests in accordance with the temporarily increased prefetch depth in advance of the upcoming high latency event.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer-readable storage device (e.g., volatile or non-volatile memory, optical or magnetic disk or other statutory manufacture) that stores program code that can be processed by a data processing system. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A memory controller for controlling access to a system memory at a lowest level of a memory hierarchy of the data processing system, the memory controller comprising:
   control logic that issues access requests to the system memory; and
   a prefetch unit that establishes a prefetch stream based on a memory access request received from a processor core, wherein the prefetch unit, in response to receiving, during operation of the memory controller, an indication of an upcoming memory refresh cycle of the system memory that will temporarily increase access latency to the system memory, temporarily increases a prefetch depth of the prefetch stream with respect to the system memory and issues, to the control logic, a plurality of prefetch requests in accordance with the temporarily increased prefetch depth in advance of the upcoming memory refresh cycle.

2. The memory controller of claim 1, wherein the memory access request of the processor core is a prefetch read request.

3. The memory controller of claim 2, wherein the prefetch unit establishes the prefetch stream in response to the prefetch read request only if the prefetch read request is marked by a core prefetch unit as belonging to an extended prefetch stream.

4. The memory controller of claim 1, wherein the prefetch unit grants the plurality of prefetch requests higher priority than at least one other prefetch request generated by the prefetch unit.

5. The memory controller of claim 1, wherein:
   the data processing system includes a system fabric; and
   the prefetch unit, prior to issuing each prefetch request among the plurality of prefetch requests, obtains authority to obtain a copy of a target memory block of that prefetch request via communication on the system fabric.

6. The memory controller of claim 1, wherein:
   the memory controller further comprises prefetch buffers that buffer a plurality of target memory blocks obtained by the plurality of prefetch requests; and
   the prefetch unit services a demand read request of the processor core by reference to the prefetch buffers.

7. The data processing system of claim 6, wherein the processor core has an associated core prefetch unit.

8. The memory controller of claim 1, wherein:
   the memory access request is a first memory access request; and
   the prefetch unit advances the prefetch stream in response to receipt of a second memory access request that hits in an address region of the prefetch stream.

9. A data processing system comprising:
   the memory controller of claim 1; and
   a processor core coupled to the memory controller.

10. The memory controller of claim 1, wherein the memory controller, after temporarily increasing the prefetch depth of the prefetch stream, decreases the prefetch depth of the prefetch stream.

11. A design structure tangibly embodied in a non-transitory machine-readable storage device for designing, manufacturing, or testing an integrated circuit, the design structure comprising:
   a memory controller for controlling access to a system memory at a lowest level of a memory hierarchy of the data processing system, the memory controller including:
      control logic that issues access requests to the system memory; and
      a prefetch unit that establishes a prefetch stream based on a memory access request received from a processor core, wherein the prefetch unit, in response to receiving, during operation of the memory controller, an indication of an upcoming memory refresh cycle of the system memory that will temporarily increase access to the system memory, temporarily increases a prefetch depth of the prefetch stream with respect to the system memory and issues, to the control logic, a plurality of prefetch requests in accordance with the temporarily increased prefetch depth in advance of the upcoming memory refresh cycle.

12. The design structure of claim 11, wherein the design structure comprises a hardware description language (HDL) design structure.

13. The design structure of claim 11, wherein the memory access request of the processor core is a prefetch read request.

14. The design structure of claim 13, wherein the prefetch unit establishes the prefetch stream in response to the prefetch read request only if the prefetch read request is marked by a core prefetch unit as belonging to an extended prefetch stream.

15. The design structure of claim 11, wherein the prefetch unit grants the plurality of prefetch requests higher priority than at least one other prefetch request generated by the prefetch unit.

16. The design structure of claim 11, wherein:

the data processing system includes a system fabric; and the prefetch unit, prior to issuing each prefetch request among the plurality of prefetch requests, obtains authority to obtain a copy of a target memory block of that prefetch request via communication on the system fabric.

17. The design structure of claim 11, wherein:

the memory controller further comprises prefetch buffers that buffer a plurality of target memory blocks obtained by the plurality of prefetch requests; and the prefetch unit services a demand read request of the processor core by reference to the prefetch buffers.

18. The design structure of claim 11, wherein:

the memory access request is a first memory access request; and the prefetch unit advances the prefetch stream in response to receipt of a second memory access request that hits in an address region of the prefetch stream.

19. The design structure of claim 11, wherein the memory controller, after temporarily increasing the prefetch depth of the prefetch stream, decreases the prefetch depth of the prefetch stream.

\* \* \* \* \*